No. 843,453. PATENTED FEB. 5, 1907.
C. W. HAMANN.
CLUTCH OPERATING MECHANISM.
APPLICATION FILED NOV. 1, 1906.
2 SHEETS—SHEET 2.
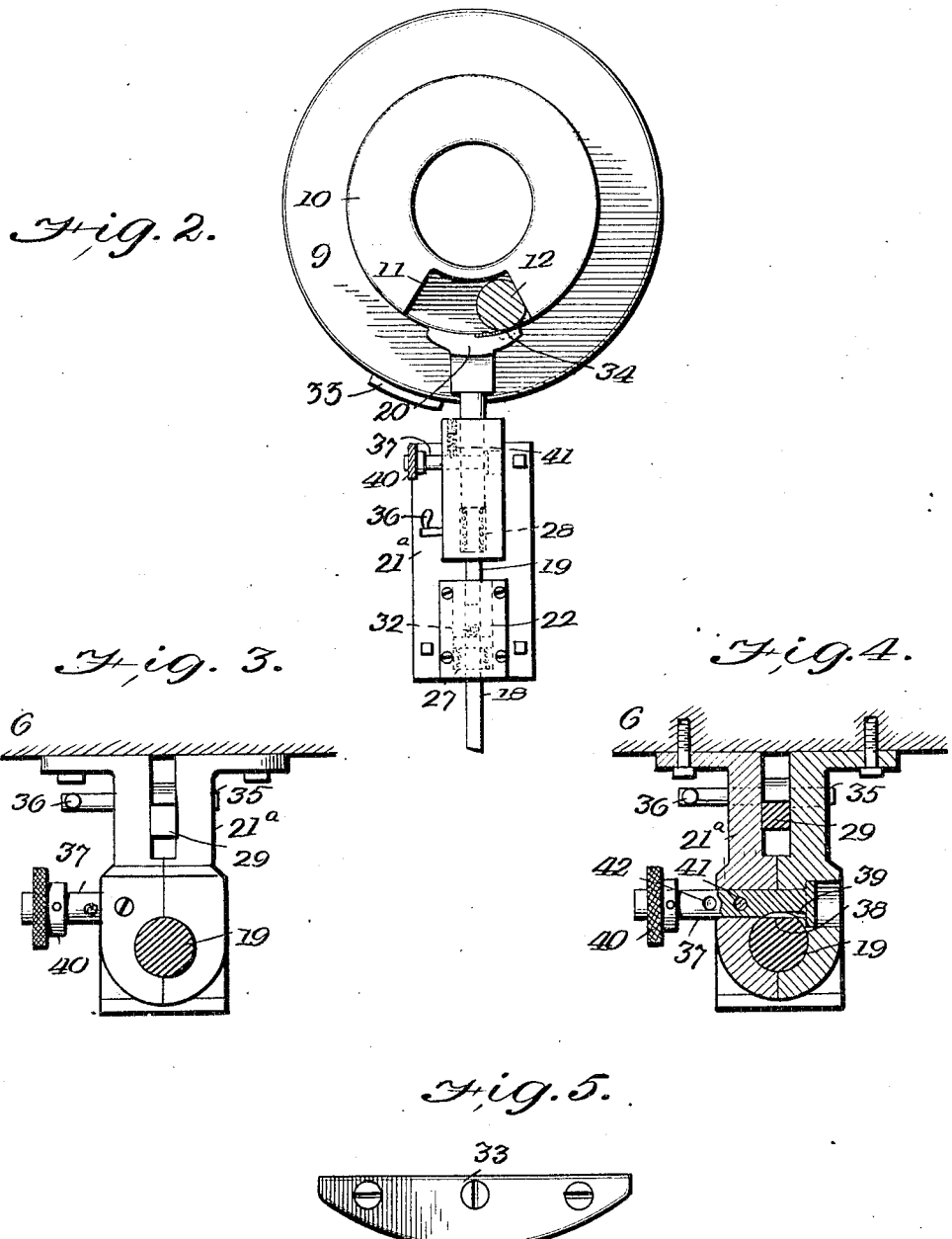
WITNESSES:
INVENTOR
Charles W. Hamann.
BY
Attorneys

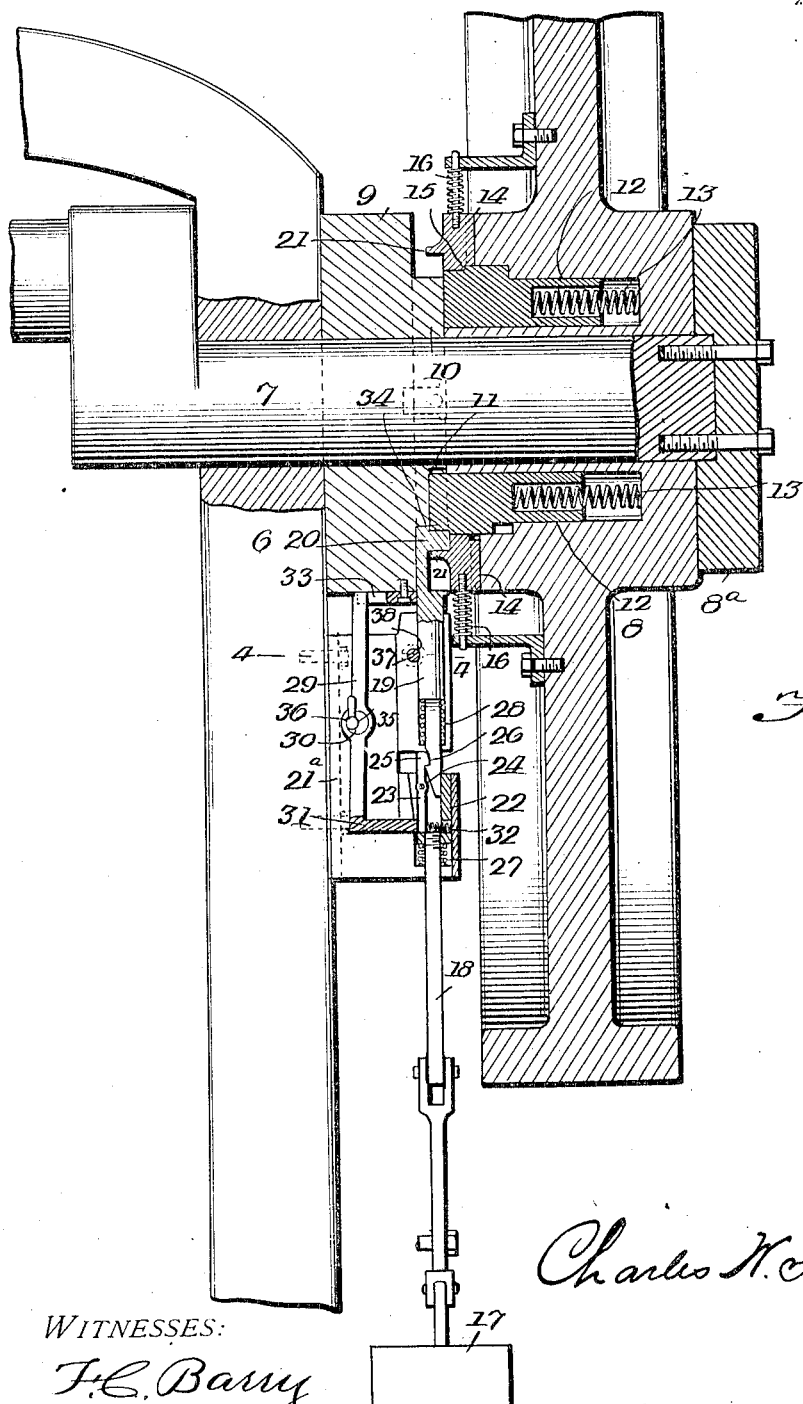

UNITED STATES PATENT OFFICE.

CHARLES W. HAMANN, OF CLEVELAND, OHIO.

CLUTCH-OPERATING MECHANISM.

No. 843,453.

Specification of Letters Patent.

Patented Feb. 5, 1907.

Application filed November 1, 1906. Serial No. 341,640.

*To all whom it may concern:*

Be it known that I, CHARLES W. HAMANN, a citizen of the United States, residing at Cleveland, in the county of Cuyahoga and State of Ohio, have invented new and useful Improvements in Clutch-Operating Mechanism, of which the following is a specification.

This invention is a mechanism for controlling clutches.

It consists particularly of a treadle-operated device provided with means whereby the clutch will be disengaged after one revolution is made by the driven wheel. The devices shown will act to automatically release the clutch after each revolution.

The invention further provides means, however, whereby the automatic action can be avoided, allowing the clutch to remain in engagement for continued rotation of the parts.

The invention also provides a lock by means of which the trip can be locked, so that the clutch cannot be operated. Thus operation of the machine may be positively prevented when not desired.

The invention is applicable to clutches of many kinds, but is illustrated in connection with a clutch of a particular kind, as will more fully appear hereinafter.

In the drawings, Figure 1 is a vertical section lengthwise of the main shaft, showing the clutch and the release devices. Fig. 2 is a side elevation, the driven or fly wheel being removed from the shaft. Fig. 3 is a top view of the clutch-release devices. Fig. 4 is a section on the line 4 4 of Fig. 1. Fig. 5 is a face view of a tripping-cam on the clutch-block.

Referring specifically to the drawings, 6 indicates the frame or standard of a machine carrying a driving-shaft 7, which may be driven in any suitable manner. The driven wheel or member 8 is mounted upon the shaft and is loose thereon, being held by a cap 8ª at the end of the shaft. The clutch acts between the shaft and the wheel to couple the same and includes a clutch-block 9, which is fast on the shaft. This block is circular and is provided with a circular shoulder 10, having a notch 11, which will receive either of the longitudinally-movable clutch-pins 12, which are slidable in recesses in the hub of the wheel 8, and the pins tend to advance to engagement in the notch by reason of spiral springs 13 behind the same, and when one of the pins is so advanced the wheel and shaft are coupled and the former is caused to turn.

Engagement of the pins 12 in the notch 11 is normally prevented by latch-pieces 14, which slide radially in guides in the hub of the wheel, and these latch-pieces engage a shoulder 15, near the front ends of the pins, and when so engaged prevent the advance of the pins. The latch-pieces are normally pressed into engagement by springs 16 behind the same. When a latch-piece is retracted, the pin 12 is permitted to advance into the notch 11 and so couple the clutch. There are two clutch-pins shown, so that the operator can engage the clutch, if desired, on half-rotation without waiting for the complete rotation, and thus save time. More or less of the clutch-pins may be used. This form of clutch above described is old and is illustrated merely for the purpose of showing the application of my invention thereto, without in any way intending to limit the invention to any particular form of clutch.

In machines where one stroke at a time is desired it is desirable that automatic means be provided for releasing the clutch after each stroke, whether the treadle or other operative mechanism for the clutch be released or not. In the present embodiment of the invention the clutch is engaged by means of a treadle 17, which is connected by a rod 18 to a trip-rod 19, which has a shoulder 20 at the top arranged to engage over a shoulder 21 on either of the blocks 14. The rod 18 has a latch connection to the trip-rod 19, to be hereinafter described, but when the treadle is operated the rod 19 is pulled down, which disengages the latch 14 and allows the pin 12 to spring into engagement in the notch 11, and so couple the clutch. To release the clutch independent of the release of the treadle, it is essential that the connection between the rods 18 and 19 be broken, and also that the pin 12 be pushed back and again engaged by the latch 14. To this end the rods 18 and 19 are mounted in guides in a bracket 21, attached to the standard 6, and the upper end of the rod 18 is screwed into a hollow block 22, which carries a swinging latch 23, pivoted to the block at 24 and having a hook 25 at the top, which is adapted to engage in a notch 26 in the lower end of the rod 19. The block 22 and rod 18 are normally lifted by a spring 27, and the rod 19 is normally lifted by a spring 28. When the latch 25 is engaged in the notch, the rods move together, but when disengaged the rod 19 is free to spring up.

At 29 is indicated a lever, which is fulcrumed upon an eccentric 30 in the bracket 21, and the lower end of this lever has an arm or piece 31, which projects in position to strike the tail of the latch 23 and by pressing the same inwardly releases the head 25 from the notch 26. A coiled spring 32 bearing against the latch tends to normally hold the same engaged. The upper end of the trip-lever 29 projects above the bracket 21 in proximity to the periphery of the clutch-block 9, and said clutch-block has on said periphery a cam 33, (see Fig. 5,) which is properly positioned to wipe against the side of the lever 29 and swing said lever.

The head or upper end of the trip-rod 19 is provided with a cam 34, which, when said trip-rod is in released or raised position, will wipe against the end of the clutch-pin 12 and force said clutch-pin back and out of engagement with the notch 11.

In operation when the treadle is depressed the trip-rod 19 is pulled down, releasing the latch 14 and allowing the pin 12 to advance into the notch 11, as indicated in Fig. 1. This being accomplished, the cam 33 then strikes the upper end of the lever 29 and swings said lever on its pivot, causing the lower end to advance the part 31 against the tail of the latch 23, thereby throwing the head of said latch out of engagement with the notch 26. This releases the trip-rod, which is at once raised by the spring 28, bringing its cam 34 in position, so that on the completion of the single revolution of the shaft the pin 12 rides up the cam 34 and out of engagement in the notch, thereby releasing the clutch. When the treadle is released, the spring 27 causes the lift of the block 22, and the head of the latch 25 is again engaged in the notch 26, ready for the next operation. In order to throw out the automatic releasing device provided by the lever 29 and to allow the rotation to continue governed only by the treadle, said lever 29 is fulcrumed upon the eccentric 30, which is pivoted, as indicated at 35, in the sides of the bracket 21 and provided with a handle 36, by means of which the eccentric may be turned to shift the lever 29, so that it will be out of the path of the cam 33, and consequently inoperative, and in this event the trip-rod 19 remains unreleased as long as the treadle continues depressed, and the clutch will accordingly remain coupled. It is occasionally desirable to lock the trip, so that the clutch cannot be coupled, and for this purpose I have provided a pin 37, which is slidable crosswise in a bore in the bracket 21, adjacent the guide of the trip-rod 19, and said rod is provided with a curved notch 38, in which the pin works. The pin has a truncated portion 39, through which the trip-rod may work. The pin is provided with a knurled head 40 to facilitate its manipulation, and there is a spring-catch 41 in a recess in the bracket, which will engage in one of the notches 42 in the pin, and so hold the same as set. When the pin is pushed in, the circular portion thereof is advanced into the notch 38, and accordingly the trip-rod 19 is locked in its upper position and cannot be operated to engage the clutch. When the pin is pulled out, so that the trip-rod comes opposite the truncation 39, the operation of the rod is not interfered with.

It will be seen that by the mechanism described means are provided for producing the intermittent or continuous operation of the driving devices, or, as shown, the trip mechanism can be locked, so that the clutch cannot be coupled. Obvious modifications of the form or connections of the trip-rod 19 will allow the same devices to be used in connection with clutches of other kinds.

I claim—

1. In a clutch-operating mechanism, in combination, a supporting-bracket having guides, a trip-rod slidable in a guide and operatively connected to the clutch, to engage or disengage the same, a treadle, a connecting-rod between the trip-rod and treadle, having a block at the top slidable in a guide, a latch pivoted to the block and arranged to engage the trip-rod, a spring tending to move the trip-rod to position to disengage the clutch, a trip-lever pivoted on the bracket beside the latch and engageable therewith to release the same and disconnect the said rods, means to automatically trip the lever after each engagement of the clutch, and means to reëngage the latch with the trip-rod when the treadle is released.

2. In a clutch-operating mechanism, in combination, a clutch having a circular block 9 the rim of which has a cam, and means to automatically release the clutch after each engagement thereof, including a trip-rod, a sliding block connected to a treadle and having a latch engageable with the rod, and a trip-lever one end of which projects into the path of the cam and the other end of which is arranged to strike the latch, and means to throw the lever out of action when desired.

In testimony whereof I have signed my name to this specification in the presence of two subscribing witnesses.

CHARLES W. HAMANN.

Witnesses:
 JOHN A. BOMMHARDT,
 SHIRLEY J. BOMMHARDT